UNITED STATES PATENT OFFICE.

CLIFFORD MITCHELL, OF CHICAGO, ILLINOIS, ASSIGNOR OF TWO-THIRDS TO PHILIP S. ROUNTREE AND SAMUEL R. JEWETT, BOTH OF SAME PLACE.

PROCESS OF PRODUCING PRESS COPIES FROM INK IMPRESSIONS.

SPECIFICATION forming part of Letters Patent No. 444,180, dated January 6, 1891.

Application filed December 2, 1889. Serial No. 332,324. (No specimens.)

*To all whom it may concern:*

Be it known that I, CLIFFORD MITCHELL, a citizen of the United States, residing at Chicago, in the county of Cook and State of Illinois, have invented a certain new and useful Improvement in the Process of Producing Press Copies from Ink Impressions; and I do hereby declare that the following is a full, clear, and exact description of the invention, which will enable others skilled in the art to which it appertains to make use of the same.

Heretofore press copies from dried ink impressions have been obtained by the use of water applied to the copying-paper or impressionable sheet before or while the latter was brought in contact with the inked surface. Press copies have also been produced by means of inks prepared with a solution of sugar or other substance, the object of the solution being to prevent the ink from drying. Copying-paper previously prepared with some substance for the mere purpose of keeping it wet has also been used. All such press copies have been mechanically produced.

The object of my invention, however, is, in press-copying, to utilize chemical reaction between chemicals, whereby an insoluble substance of positive color, permanent when exposed to light and air, is formed, and by the agency of the deliquescent property of chemicals, which provides the moisture necessary to effect that reaction to do away with the mechanical moistening of the copying-paper, although copying-paper prepared in such manner as to prevent its drying has been heretofore used, and also to avoid an ink which clogs or remains wet. In my utilization of the reactive and absorbent properties of chemicals in combination consists the wide difference between old processes and my invention.

My invention consists of treating ink with a readily-soluble and deliquescent chemical substance, such as ferric chloride, or with two or more soluble chemical substances having in combination strong deliquescing and reacting property, such as calcium chloride and ferric chloride, and of treating copying-paper with a soluble chemical substance, such as potassium ferro-cyanide, which is deliquescent and reacts upon the chemical reagent in the ink, or with two or more soluble chemical substances, which in combination have those properties when brought into contact with said chemically-prepared ink, and further consists of bringing impressions made with ink so prepared into contact with copying-paper so prepared and obtaining thereby upon the copying-paper a copy which is formed of a new, permanent, and insoluble chemical substance of positive color.

When using the above-named chemical substances one part of ferric chloride, three parts of calcium chloride, and ten parts of ordinary aniline ink constitute the proportions giving satisfactory results, and the copying-paper contains when properly prepared a saturated solution of the potassium ferro-cyanide incorporated either when the paper is made or in its sizing, or afterward, by soaking it therein. I do not confine myself to the chemical substances above specified, as others which are deliquescent or have an affinity for moisture, and which combine to form a chemical reaction, effect the same result.

Marks made with ink prepared as described become coated on exposure to air, retaining, however, sufficient moisture to promote chemical reaction when in contact under pressure with copying-paper prepared as described.

In my process the sheet written or marked with prepared writing ink or fluid is any time within an hour, or longer, if desired, after marked or written upon, placed under pressure, its surface in contact with the prepared copying-paper or impressionable sheet, and permitted to so remain during, say, half a minute. The pressure then being removed and the sheets detached, a press copy is then found to be made upon the copying-paper or impressionable sheet.

I am aware that other inventions embody the principle of chemical reaction between ink and copying-paper which in practical use require the application by mechanical means of moisture whenever any considerable delay occurs between the instant of writing with the ink and the instant of bringing the copying-paper in contact therewith. I am also aware that copying-paper prepared with non-drying substances merely has been used; also, that other inventions involve the use of inks which remain wet upon the surface of the writing-paper. The difference between such processes and mine is that my invention embodies the chemical reaction which produces the clear and permanent lines of color in the press-copy, and also embodies the moisture necessary to effect that reaction through the agency of the chemical reaction which is thereby obtained.

Having fully described my invention, what I desire to claim and secure by Letters Patent is—

1. The process of producing press copies from ink impressions, consisting of, first, preparing ink with a readily-soluble reacting and deliquescent chemical or combination of chemicals, such as ferric chloride and calcium chloride, and, second, preparing copying-paper by treating it with a readily-soluble deliquescent chemical which reacts chemically with the chemical with which the ink is prepared, such as potassium ferro-cyanide, or with a combination of chemicals of that character, and, third, then bringing the ink impressions in contact with the copying-paper without applying moisture.

2. Copying-paper treated with a readily-soluble chemical, such as potassium ferro-cyanide, and possessing the reacting deliquescing effect when in contact with ink containing a reacting deliquescing agent, substantially as specified.

3. Copying-ink prepared with a readily soluble chemical, such as ferric chloride, and a chemical having affinity for moisture, such as calcium chloride, which possess the reacting deliquescing property when brought in contact with copying-paper containing a reacting agent, substantially as specified.

CLIFFORD MITCHELL.

Witnesses:
FRANK W. PETTIT,
MARTIN KOEBEL.